(12) United States Patent
Pollet

(10) Patent No.: US 11,863,309 B2
(45) Date of Patent: *Jan. 2, 2024

(54) SYSTEM AND METHOD FOR CAPTURING AND DISTRIBUTING LIVE AUDIO STREAMS OF A LIVE EVENT

(71) Applicant: Prowire Sport LLC, Wilmington, DE (US)

(72) Inventor: Michel Pollet, Burnham (GB)

(73) Assignee: Prowire Sport LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/162,574

(22) Filed: Jan. 31, 2023

(65) Prior Publication Data

US 2023/0179647 A1    Jun. 8, 2023

Related U.S. Application Data

(63) Continuation of application No. 16/027,508, filed on Jul. 5, 2018, now Pat. No. 11,606,407.

(51) Int. Cl.
*H04L 65/75* (2022.01)
*H04L 69/164* (2022.01)
(Continued)

(52) U.S. Cl.
CPC .......... *H04L 65/765* (2022.05); *H04L 69/164* (2013.01); *H04N 21/2187* (2013.01); *H04N 21/6125* (2013.01)

(58) Field of Classification Search
None
See application file for complete search history.

(56) References Cited

U.S. PATENT DOCUMENTS

| 5,719,786 A | 2/1998 | Nelson et al. |
|---|---|---|
| 5,844,600 A | 12/1998 | Kerr |

(Continued)

FOREIGN PATENT DOCUMENTS

| KR | 101129885 B1 | 3/2012 |
|---|---|---|
| WO | 2018213171 A1 | 11/2018 |
| WO | 2018213173 A1 | 11/2018 |

OTHER PUBLICATIONS

U.S. Appl. No. 15/977,269, Advisory Action, dated Aug. 31, 2020, 6 pages.

(Continued)

*Primary Examiner* — Joshua Joo
(74) *Attorney, Agent, or Firm* — Kilpatrick Townsend & Stockton LLP

(57) ABSTRACT

A system for capturing and distributing live multimedia or video streams of a live event to mobile computing devices is described. The system includes processing device(s) in network communication with each other. Processing device(s) having at least one channel receive live multimedia or video stream(s) via the at least one channel(s), generate and transmit discrete data packets therefrom over a first network for receipt by the remaining processing device(s). Copies of the discrete data packets are generated and placed in a respective buffer by the processing device(s). A nominated processing device: receives a connection request from a mobile computing device; determines the distribution status the processing device(s); and selects a processing device to provide the requested transmission based on the distribution status. The selected device generates transmission copies from copies stored in the buffer and transmits the discrete data packets/transmission copies to the mobile computing device.

24 Claims, 8 Drawing Sheets

(51) Int. Cl.
*H04N 21/2187* (2011.01)
*H04N 21/61* (2011.01)

(56) References Cited

U.S. PATENT DOCUMENTS

| | | | |
|---|---|---|---|
| 6,195,680 | B1 | 2/2001 | Goldszmidt et al. |
| 7,154,898 | B1 | 12/2006 | Pecus et al. |
| 7,313,593 | B1 | 12/2007 | Pulito et al. |
| 7,502,818 | B2 * | 3/2009 | Kohno .............. H04N 21/6437 709/231 |
| 7,571,253 | B2 | 8/2009 | Lee |
| 7,830,787 | B1 | 11/2010 | Wijnands et al. |
| 8,085,784 | B2 | 12/2011 | Komagata et al. |
| 8,370,888 | B2 | 2/2013 | Zimmermann et al. |
| 8,681,768 | B2 | 3/2014 | Cote et al. |
| 8,861,520 | B1 | 10/2014 | Signaoff et al. |
| 8,880,632 | B1 | 11/2014 | Michels |
| 9,148,257 | B2 | 9/2015 | Ilan |
| 11,089,341 | B2 | 8/2021 | Pollet |
| 11,461,070 | B2 | 10/2022 | Einziger et al. |
| 11,606,407 | B2 | 3/2023 | Pollet |
| 2001/0027491 | A1 | 10/2001 | Terretta et al. |
| 2004/0170159 | A1 | 9/2004 | Kim et al. |
| 2004/0225728 | A1 | 11/2004 | Huggins et al. |
| 2005/0183120 | A1 | 8/2005 | Jain et al. |
| 2006/0222323 | A1 | 10/2006 | Sharpe et al. |
| 2007/0201454 | A1 | 8/2007 | Weir et al. |
| 2008/0114600 | A1 | 5/2008 | Shaffer et al. |
| 2008/0130616 | A1 | 6/2008 | Wengerter et al. |
| 2009/0077254 | A1 | 3/2009 | Darcie et al. |
| 2009/0172200 | A1 * | 7/2009 | Morrison ............ G10H 1/0058 709/248 |
| 2010/0074255 | A1 | 3/2010 | Harpaz et al. |
| 2011/0153862 | A1 | 6/2011 | Roosta et al. |
| 2011/0228769 | A1 | 9/2011 | Haimi-Cohen et al. |
| 2012/0151075 | A1 | 6/2012 | Mraz et al. |
| 2012/0259994 | A1 | 10/2012 | Gillies et al. |
| 2013/0024582 | A1 | 1/2013 | Rodrigues |
| 2013/0067523 | A1 | 3/2013 | Kamitakahara et al. |
| 2013/0112065 | A1 | 5/2013 | Rutledge et al. |
| 2014/0002738 | A1 | 1/2014 | Nunes |
| 2014/0280642 | A1 | 9/2014 | van Oldenborgh et al. |
| 2014/0369249 | A1 | 12/2014 | Mikhailov et al. |
| 2015/0058120 | A1 | 2/2015 | Guo et al. |
| 2015/0071458 | A1 | 3/2015 | Sullivan |
| 2015/0150065 | A1 | 5/2015 | Shankar et al. |
| 2015/0254056 | A1 | 9/2015 | Walker et al. |
| 2015/0256580 | A1 | 9/2015 | Morton et al. |
| 2016/0036693 | A1 | 2/2016 | Galdy et al. |
| 2016/0373819 | A1 | 12/2016 | Ramakrishnan et al. |
| 2016/0381101 | A1 | 12/2016 | Tse |
| 2017/0118263 | A1 | 4/2017 | Crabtree et al. |
| 2017/0123991 | A1 | 5/2017 | Sela et al. |
| 2017/0163567 | A1 * | 6/2017 | Roitshtein .......... H04L 49/9005 |
| 2017/0201571 | A1 * | 7/2017 | Sherf ................. H04L 67/1029 |
| 2017/0272375 | A1 | 9/2017 | Muesch et al. |
| 2017/0339203 | A1 | 11/2017 | Kekre et al. |
| 2018/0032967 | A1 | 2/2018 | Barker et al. |
| 2018/0054481 | A1 * | 2/2018 | Bradley ............. H04N 21/4305 |
| 2018/0234361 | A1 | 8/2018 | Bergman |
| 2018/0324073 | A1 | 11/2018 | Kai |
| 2018/0329670 | A1 * | 11/2018 | Einziger ................... G06F 3/00 |
| 2019/0075430 | A1 | 3/2019 | Lincoln et al. |
| 2020/0021892 | A1 | 1/2020 | April et al. |

OTHER PUBLICATIONS

U.S. Appl. No. 15/977,269, Non-Final Office Action, dated Oct. 3, 2019, 18 pages.
U.S. Appl. No. 15/977,269, Non-Final Office Action, dated Mar. 18, 2021, 19 pages.
Bui et al., "Soft Real-Time Chains for Multi-Hop Wireless Ad-Hoc Networks", Real Time and Embedded Technology and Applications Symposium, RTAS'07, 13th IEEE, 2007, 10 pages.
Application No. PCT/US2019/031493, International Preliminary Report on Patentability, dated Nov. 26, 2020, 9 pages.
Application No. PCT/US2019/031493, International Search Report and Written Opinion, dated Jul. 23, 2019, 11 pages.
Application No. PCT/US2019/040049, International Preliminary Report on Patentability, dated Jan. 14, 2021, 10 pages.
Application No. PCT/US2019/040049, International Search Report and Written Opinion, dated Sep. 20, 2019, 11 pages.
U.S. Appl. No. 17/377,105, Notice of Allowance, dated Feb. 8, 2023, 21 pages.
U.S. Appl. No. 15/977,269, "Final Office Action", dated Jan. 10, 2020, 19 pages.
U.S. Appl. No. 15/977,269, "Notice of Allowance", dated Jul. 1, 2021, 19 pages.
U.S. Appl. No. 16/027,508, "Advisory Action", dated Nov. 18, 2020, 3 pages.
U.S. Appl. No. 16/027,508, "Final Office Action", dated Oct. 26, 2021, 27 pages.
U.S. Appl. No. 16/027,508, "Final Office Action", dated Sep. 4, 2020, 25 pages.
U.S. Appl. No. 16/027,508, "Non-Final Office Action", dated Dec. 30, 2019, 25 pages.
U.S. Appl. No. 16/027,508, "Non-Final Office Action", dated Jun. 23, 2022, 7 pages.
U.S. Appl. No. 16/027,508, "Non-Final Office Action", dated Mar. 23, 2021, 25 pages.
U.S. Appl. No. 16/027,508, "Notice of Allowance", dated Oct. 28, 2022, 11 pages.

\* cited by examiner

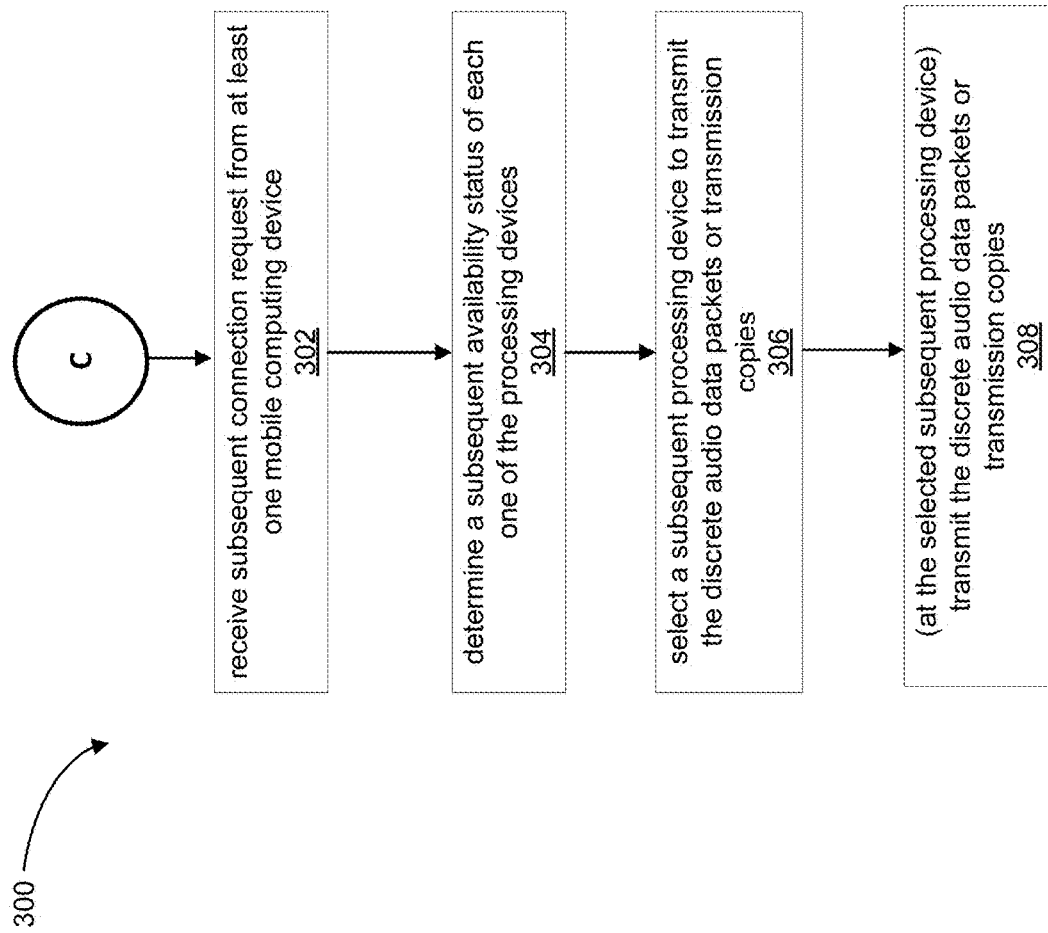

SYSTEM AND METHOD FOR CAPTURING AND DISTRIBUTING LIVE AUDIO STREAMS OF A LIVE EVENT

CROSS-REFERENCE TO RELATED APPLICATIONS

This application claims priority to U.S. patent application Ser. No. 16/027,508, filed on Jul. 5, 2018, the disclosure of which is herein incorporated by reference in its entirety.

FIELD

The specification relates generally to the transmission of live audio streams, and specifically to systems and methods for capturing and distributing live audio streams of a live event to a plurality of mobile computing devices.

BACKGROUND

Audio streaming is commonly used by radio stations and music streaming services to distribute audio material over the Internet. In general, Internet-based audio streaming services utilize cloud-based computer devices, such as servers, to host users and deliver content. This is a common method to deliver audio content over the Internet where latency is not an issue (for example, where someone is listening to an Internet radio station in the car and would not notice (or care) if the audio content was significantly delayed from the source). These cloud-based solutions allow Internet-radio streaming services to scale up by adding computing capacity to accommodate a greater number of concurrent users. However, this ability to scale up typically comes at the expense of significant latency or delay between the audio content at the source and the audio content as presented to the listener.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 7 depicts an example method for graceful recovery of a system for capturing and distributing live audio streams of a live event to a plurality of mobile computing devices, according to non-limiting embodiments.

DETAILED DESCRIPTION

Figure 1:
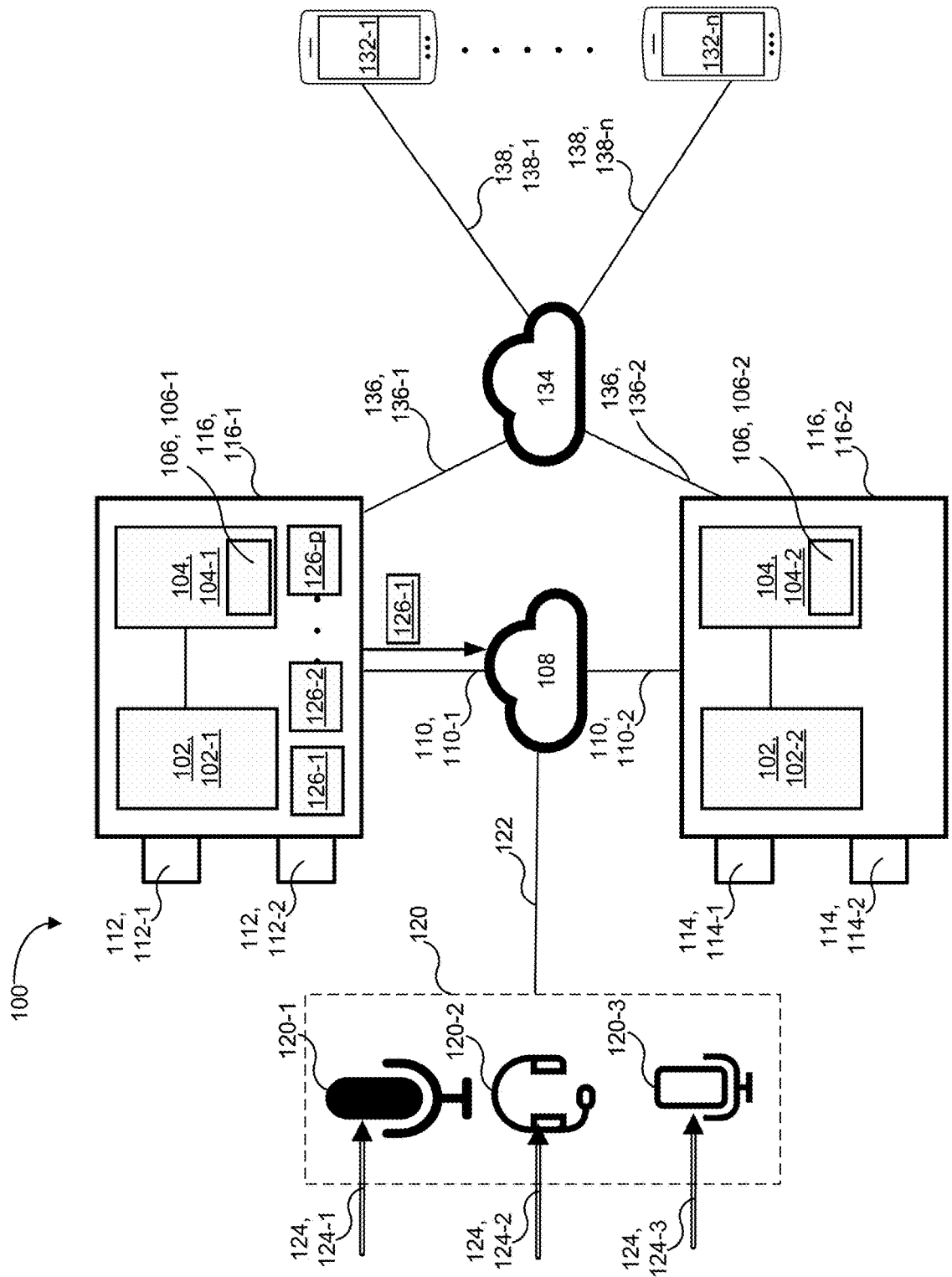
FIG. 1 depicts an example system for capturing and distributing live audio streams of a live event to a plurality of mobile computing devices, according to non-limiting embodiments.

Herein described are systems and methods for capturing and distributing live audio streams of a live event to a plurality of mobile computing devices. According to some embodiments, the capture and distribution of the live audios streams are performed in real-time. Although the systems and methods described herein describe the capturing and distribution of live audio streams, it is understood that the systems and methods may also be utilized to capture one or more live multimedia streams that comprises audio data and video data or one or more live video streams that comprises video data (without audio data).

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Generally, the described systems and methods are suitable for use at live events, such as sporting events, in large venues, such as sports stadia or convention centers. One or more computing devices, such as servers, are used to stream live audio to the audience members at the venue via their respective mobile computing devices. Audience members can receive the audio stream(s) on their own mobile phone or another mobile computing device. According to some embodiments, the audio stream(s) is used in venue only, does not leave the local area network (LAN) of the venue and does not cross the Internet.

The audio that is streamed typically relates directly to the live event in progress in the venue. For example, according to some embodiments, live audio is captured from an athlete, referee or in-venue commentator (via at least one audio input device, such as a microphone worn by the athlete, referee or in-venue commentator) as they participate in, or comment on, a sports match. The audience member can listen via their mobile computing device to what is being said on the field of play as they watch the action.

Latency or delay is a particularly important consideration in the distribution of a live audio stream of a live event in a venue. The audio stream relates to live action happening in view of the audience, so it is particularly important to the listening audience member that the audio and live action appear to be synchronized. If there is too much delay between what the audience sees and what they hear then the effect will tend to be distracting and may ruin the experience. Persons skilled in the art will appreciate that end-to-end latencies up to and including 500 milliseconds (mS) are generally considered "real-time". However, the amount of delay that can be tolerated depends upon what the audience members can see and hear. For example, if the audience can see a player's or a commentator's lips moving while they are talking then generally an audio delay, or end-to-end latency, of more than 45 mS is usually problematic. If the audience members are further away, so that they cannot see the lips moving, then a delay, or end-to-end latency, of 100 to 500 mS may be an acceptable user experience.

Venue size can vary. For example, some venues can accommodate a few hundred attendees, whereas there are venues that can accommodate up to 100,000 attendees. The ability to scale up the distribution of media data, such as audio data, is particularly important when such a large number of client devices are to be connected (or potentially connected). As discussed, typical audio streaming services tend to utilize cloud-based computing devices, such as servers, to host users and deliver content. Such audio streaming services are optimized to provide good quality audio while latency is deemed to be less important. In order to scale up quickly, significant latency or delay between the audio content at the source and the audio content as presented to the listener is introduced. In some instances, these systems may introduce latency of more than 30 seconds.

The described systems and methods provide a distributed architecture which allows for the scaling of a streaming platform to a large number of users (via associated mobile computing devices, also referred to herein as "mobile clients" or "client devices") by adding audio capture and distributing computing devices (such as servers, or more granularly, processing devices), while maintaining a unified external interface to the mobile clients. According to some embodiments, the system infrastructure locally distributes audio content (over, for example, a LAN or similar medium) and is physically located in each stadium in which it operates. According to some embodiments, the described systems can be scaled up on demand to accommodate an increased client device load with reduced latency in comparison to typical cloud-based, audio streaming systems.

According to some embodiments, the described systems are self-managing and can gracefully recover if one or more computing devices (such as servers, or more granularly, processing devices) fails.

Figure 2:
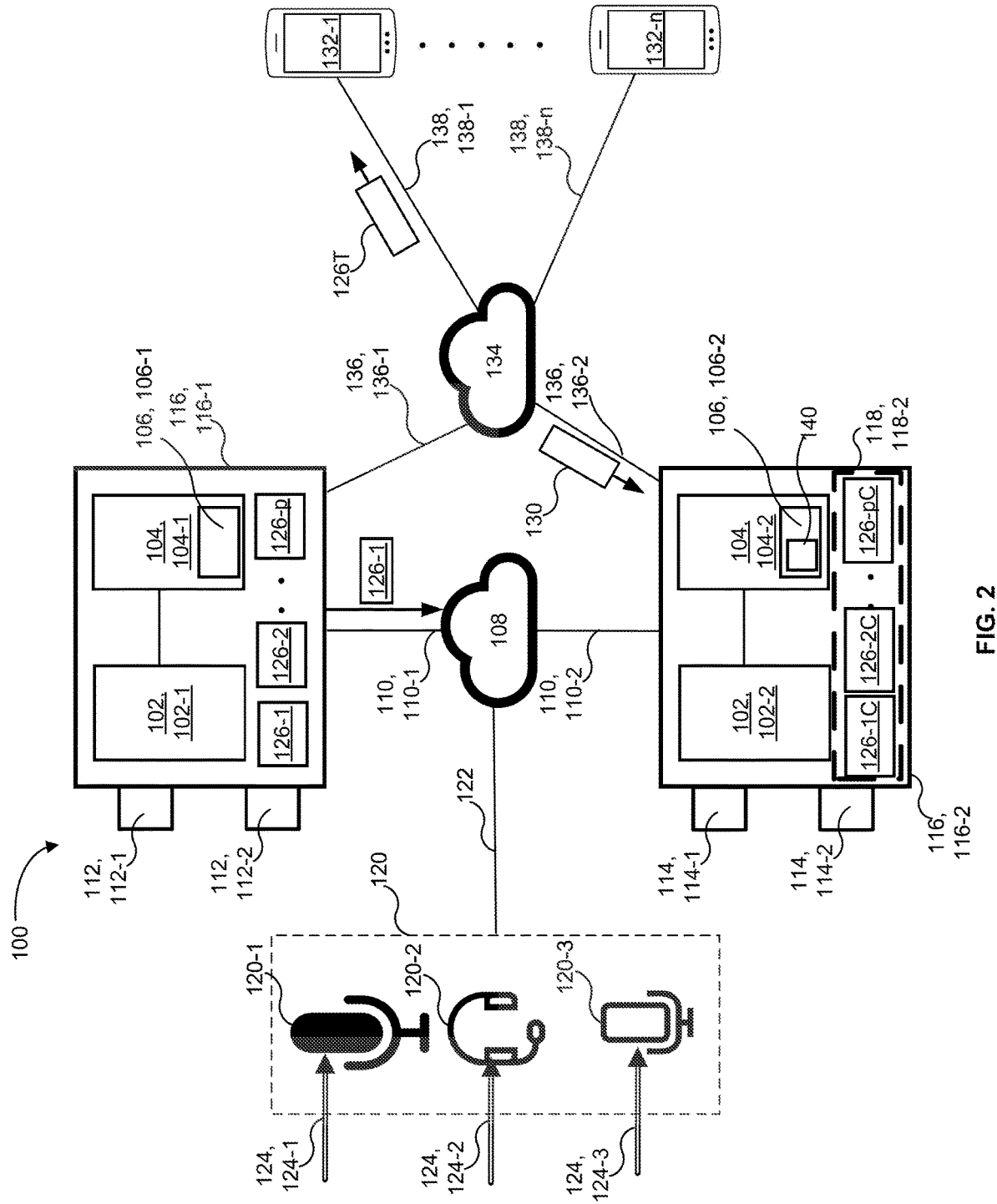
FIG. 2 depicts certain aspects of the example system for capturing and distributing live audio streams of FIG. 1, according to non-limiting embodiments.

Attention is directed to FIGS. 1 and 2, which depict an example system 100 for capturing and distributing live audio streams of a live event to a plurality of mobile computing devices. System 100 comprises a plurality of processing devices 102 (also referred to herein as processing devices 102). Although the plurality of processing devices 102 are depicted as comprising two processing devices, processing device 102-1 and processing device 102-2, it is understood that, according to some embodiments, system 100 comprises more than two processing devices. As used herein, the terms "processing device", "processing devices", "processing device(s)", "processor", "processors" or "processor(s)" may refer to any combination of processing devices, and the like, suitable for carrying out the actions or methods described herein. For example, processing devices 102 may comprise any suitable processing device, or combination of processing devices, including but not limited to a microprocessor, a central processing unit (CPU) and the like. Other suitable processing devices are also within the scope of the application.

Processing devices 102 are each coupled to at least one memory 104. For example, processing device 102-1 is coupled to memory 104-1 and processing device 102-2 is coupled to memory 104-2. Memory 104-1 and memory 104-2 can each comprise any suitable memory device, including but not limited to any suitable one of, or combination of, a local and/or remote volatile memory, non-volatile memory, random access memory (RAM), read-only memory (ROM), hard drive, optical drive, buffer(s), cache(s), flash memory, magnetic computer storage devices (e.g. hard disks, floppy disks, and magnetic tape), optical memory (e.g., CD(s) and DVD(s)), and the like. Other suitable memory devices are also within the scope of the application. As such, it is understood that the term "memory", or any variation thereof, as used herein may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processing device(s) and/or microcontroller(s) described herein.

Memory 104-1 and memory 104-2 are configured to store computer-executable instructions 106, as computer executable instructions 106-1 and 106-2 respectively, for execution by at least one processing device, including processing devices 102-1 and 102-2. According to some embodiments, the computer executable instructions 106 comprise subsets of instructions based on particular functionalities, such as audio capture, media management and session management. These modules may communicate with each other to perform the functions described herein. According to some embodiments, these functionalities may be embodied as modules of the computer-executable instructions 106. According to some embodiments, the audio capture module accepts raw audio from an external interface, such as an analogue audio card, and digitizes it, if needed, and compressed using an audio codec, as discussed further below. According to some embodiments, the session manager module accepts incoming connection requests from client devices (e.g., mobile computing devices) and matches mobile clients with available processing devices via their respective media manager modules. According to some embodiments, the media manager streams the audio packets to client devices.

According to some embodiments, these functionalities may be distributed over the plurality of processing devices 102 such that each processing device is configured to participate in one or more functionalities (e.g., audio capture, media management and session management). For example, according to some embodiments, executable instructions 106-1 may comprise the audio capture and media management functionalities, whereas executable instructions 106-2 comprises the session management functionality. According to some embodiments, more than one of the processing devices 102 share at least one of the audio capture, media management and session management functionalities, via the respective computer executable instructions 106.

In FIGS. 1 and 2, processing device 102-1 and memory 104-1, and processing device 102-2 and memory 104-2, are depicted as being co-located on the same computing device (e.g., computing device 116-1 in respect of processing device 102-1 and memory 104-1, and computing device 116-2 in respect of processing device 102-2 and memory 104-2). Computing device 116-1 and 116-2 (referred to collectively as computing devices 116) may each comprise one or more computing devices. According to some embodiments, processing device 102-1 and memory 104-1, and processing device 102-2 and memory 104-2, are not co-located on the same computing device. For example, according to some embodiments, computing device 116-1 comprises two or more servers in wired and/or wireless communication with each other, and processing device 102-1 is located at one of the servers while memory 104-1 is located at another one of the servers. Similarly, according to some embodiments, computing device 116-2 comprises two or more servers in wired and/or wireless communication with each other, and processing device 102-2 is located at one of the servers while memory 104-2 is located at another one of the servers.

Processing devices 102 are in network communication with each other. For example, processing devices 102 may be configured to communicate with each other over a first network 108 via communication links 110 (individually referred to as communication link 110-1 and communication link 110-2). Communication links 110 may each comprise any suitable wired and/or wireless communication link(s), or suitable combination thereof. The processing devices 102 may also be configured to transmit and receive data over the first network 108 according to any suitable protocol or protocols, such as wireless data protocols, cellular device protocols, WiFi protocols, WiMax protocols, Real-Time Transport Protocol (RTP) and/or a combination of protocols. According to some embodiments, the first network 108 is a private LAN of the venue hosting the live event. According to some embodiments, the first network 108 is a wireless network.

At least one of the processing devices 102 is associated with at least one audio channel. For example, processing device 102-1 is associated with audio channels 112 (referred to individually as audio channel 112-1 and audio channel 112-2) and processing device 102-2 is associated with audio channels 114 (referred to individually as audio channel 114-1 and audio channel 114-2). Each of the audio channels 112, 114 are configured to receive a live audio stream from the live event. Although processing devices 102 are depicted as each being associated with two audio channels, it is understood that at least one of the processing devices 102 may be associated with one or more audio channels. For example, according to some embodiments, processing device 102-1 is associated with one audio channel and processing device 102-2 is associated with two or more audio channels. According to some embodiments, at least one of the processing devices 102 does not have an associated audio channel and does not participate in the audio capture activity. Such processing devices (i.e., processing devices without any associated audio channels) may participate in other activities, including media management and/or session management, to transmit the plurality of discrete audio data packets 126 or copies therefrom 126C, as discussed further below.

According to some embodiments, at least one of the plurality of processing devices 102, such as processing device 102-1, have at least one audio channel associated therewith and are configured to receive at least one live audio stream via at least one of the associated audio channels 112, 114 in accordance with computer-executable instructions 106. For example, processing device 102-1 may be coupled to at least one of the audio input devices 120 (referred to individually as audio input device 120-1, 120-2 and 120-3) and configured to communicate with at least one of the audio input devices 120 over communication link 122 via the first network 108, or another suitable network. Communication link 122 comprises any suitable wired and/or or wireless communication link(s), or suitable combination thereof. The processing device 102-1 may also be configured to communicate with at least one of the audio devices 120 in accordance with any suitable protocol or protocols, such as wireless data protocols, cellular device protocols, WiFi protocols, WiMax protocols, and/or a combination thereof.

It is understood that the at least one processing device that receives the at least one live audio stream comprises one or more of the plurality of processing devices. For example, according to some embodiments, the number of processing devices that receive the at least one live audio stream comprises less than the total number of the processing devices 102. However, according to some embodiments, the number of processing devices that receive the at least one live audio stream comprises all of the processing devices 102.

The audio devices 120 comprise any suitable audio input devices, such as a wired or wireless microphone worn by a referee, player or a commentator of the live event. The audio input devices 120 receive at least one of live audio streams 124. For example, audio input device 120-1 receives first live audio stream 124-1 via audio input device 120-1, audio input device 120-2 receives second live audio stream 124-2 via audio input device 120-2 and audio input device 120-3 receives third live audio stream 124-3 via audio input device 120-3. The live audio streams 124 each comprise a live audio signal that conveys, for example, a referee's or a commentator's voice. For example, first live audio stream 124-1 may comprise a live audio signal of a referee's voice, second live audio stream 124-2 may comprise a live audio signal of a commentator's voice and third live audio stream 124-3 may comprise a live audio signal of an athlete's voice. According to some embodiments, the audio input devices 120 receive the live audio streams 124 in real-time. According to some embodiments, each of the live audio streams 124 are live audio streams comprising the same live audio signal.

Processing devices 102 are also configured to communicate with a plurality of mobile devices 132-1 to 132-$n$ (referred to collectively as the plurality of mobile computing devices 132 or mobile computing devices 132). For example, the processing devices 102 may be enabled to transmit and/or receive data over the first network 108 and/or, as shown in FIGS. 1 and 2, a second network 134 via suitable communication links, such as communication links 136-1, 136-2 and 138-1 to 138-$n$ (communication links 136-1 and 136-2 referred to collectively as communication links 136, communications links 138-1 to 138-$n$ referred to collectively as communication links 138). The communication links 136 and 138 comprise any suitable wired and/or wireless communication link(s), or suitable combination thereof. The processing devices 102 may also be configured to transmit and receive data over the second network 134 according to any suitable protocol or protocols, such as wireless data protocols, cellular device protocols, WiFi protocols, WiMax protocols, Real-Time Transport Protocol (RTP) and/or a combination of protocols. According to some embodiments, the second network 134 is a LAN of the venue hosting the live event. According to some embodiments, the second network 134 is a public LAN of the venue. According to some embodiments, the second network 134 is a wireless network. According to some embodiments, the second network 134 is a cellular network.

The mobile computing devices 132 are any computing devices suitable for communicating with the processing devices 102 (e.g., over second network 134) and for outputting received audio data to users of the mobile computing devices 132. For example, mobile computing devices 132 may be one or more tablet computing devices, laptop computing devices, PDAs (personal digital assistants), cellphones, smartphones, computer terminals having at least one suitable audio output device (including, without limitation, devices which are configured to use Bluetooth™ or a similar medium in conjunction with an audio output device). In addition, the mobile computing devices 132 are configured to subscribe to one of more of the live audio streams 124.

As discussed above, at one of the plurality of processing devices 102, such as processing device 102-1, have at least one audio channel associated therewith and are configured to receive at least one live audio stream via at least one of the audio channels 112, 114 in accordance with computer-executable instructions 106. The received live audio stream(s) may be in analog and/or digital format. According to some embodiments, if the received live audio stream(s) is in analog format (i.e., an analog signal), then the processing device(s) receiving the live audio stream, in accordance with the computer-executable instructions 106, is enabled to convert the received live audio stream(s) into a digital format. According to some embodiments, the processing device(s) receiving the live audio stream(s) is configured to compress the live audio stream(s) using a suitable audio codec. According to some embodiments, the codec is a low latency audio codec, such as G.711, MP3 or Opus.

For example, according to some embodiments, processing device 102-1 is enabled to receive live audio stream 124-1 via audio channel 112-1. In accordance with computer-executable instructions 106-1, the processing device 102-1 is enabled to generate a plurality of discrete audio data packets 126-1 to 126-$p$ (also referred to collectively as discrete audio data packets 126) from the live audio stream 124-1. The processing device 102-1 is further enabled to transmit the discrete audio data packets 126, over the first network 108 or another suitable network, for receipt by at least one of the remainder of the plurality of the processing devices 102, such as processing device 102-2 (see FIG. 2). In other words, the discrete audio data packets 126 are distributed among the processing devices 102 such that at least one of the processing devices 102 has access to the discrete audio data packets 126. According to some embodiments, the discrete audio data packets are transmitted to each one of the processing devices 102 such that each of those processing devices has access to the discrete audio data packets.

The internal distribution of the discrete audio data packets over the first network 108 or another suitable network may occur in a number of suitable ways. For example, according to some embodiments, processing device 102-1, as a processing device that participates in the audio capture activity, receives the discrete audio data packets 126 generated from at least one of the remainder of the processing devices also participating in the audio capture activity after transmitting the discrete audio data packets that it has generated to the remainder processing devices, such as to processing device 102-2. As another example, according to some embodiments, processing device 102-1 transmits the discrete audio data packets 126 it has generated to itself in addition to the remainder of the processing devices (i.e., at least one of the processing devices participating in the audio capture activity receives the discrete audio data packets 126 it generated from itself). In other words, according to some embodiments, the transmit and receive processes utilized to internally distribute over the first network 108 or another suitable network the discrete audio data packets 126 among the processing devices are harmonized. Harmonizing these processes may lead to a reduction in the complexity of the computer executable instructions 106 and debugging, and help to streamline the scaling of system 100 to handle distribution of the live streams 124 to the mobile devices 132.

According to some embodiments, at at least one of the processing devices 102, copies of the discrete audio data packets 126-1C to 126-$p$C (referred to collectively as copies of discrete audio data packets 126C or copies 126C) are generated from the discrete audio data packets 126. According to some embodiments, each one of the processing devices 102 generates copies 126C.

For example, as shown in FIG. 2, processing device 102-2 generates copies 126C from the discrete audio data packets 126 received from processing device 102-1. In respect of the processing device(s) that participated in the audio capture activity, the copies 126C may be generated from the discrete audio data packets 126 prior to transmitting the discrete audio data packets 126 to at least one of the remainder processing devices, according to some embodiments. Alternatively, as discussed above, the processing device that participated in the audio capture activity may, after transmitting the discrete audio data packets 126 to the remainder processing devices, receive the discrete audio data packets 126 from one of the remainder processing devices (such as processing device 102-2) or from itself. According to such embodiments, the copies 126C generated by the processing device that participated in the audio capture activity are generated from the received discrete audio data packets 126.

Figure 8A:
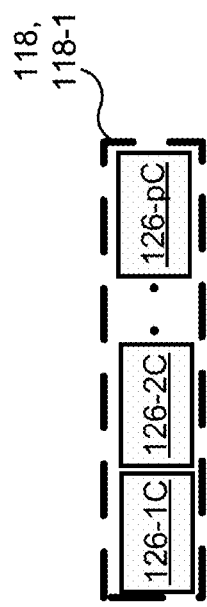
FIGS. 8A and 8B depict certain aspects of the example system for capturing and distributing live audio streams of FIG. 1, according to non-limiting embodiments.
Figure 8B:
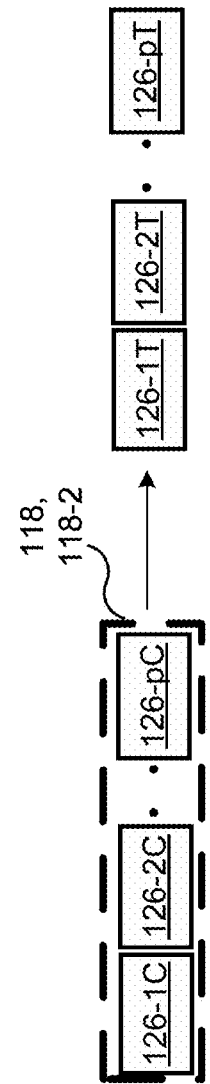

The copies 126C generated by the processing devices 102 are placed in a buffer accessible to the respective processing device of the plurality of processing devices 102. For example, as shown in FIGS. 8A and 8B, the copies 126C generated by processing devices 102-1 and 102-2 are placed in buffers 118-1 and 118-2 (referred to collectively as buffers 118). According to some embodiments, buffers 118 may be local to the respective processing device of processing devices 102. According to some embodiments, one or more of buffers 118 may be remote from the respective processing device of processing devices 102. As discussed further below, the processing devices 102 may read from the buffers 118 in order to fulfil requests from the mobile computing devices 132 for transmission of the live streams 124.

According to the described systems and methods, in at least some embodiments, the plurality of processing devices 102 have access to the discrete audio data packets 126 or the copies 126C therefrom. As a result, the mobile computing devices 132 are able to access the requested live audio stream (e.g., live audio stream 124-1) from any one of the plurality of processing devices 102, even if the transmitting processing device is not any of the processing devices that initially received the requested live audio stream.

As discussed above, according to some embodiments, more than one of the plurality of processing devices may be enabled to receive at least one of the live audio streams via at least one associated audio channel. For example, according to some embodiments, processing device 102-1 is configured to receive first live audio stream 124-1 via audio channel 112-1, as described above, and processing device 102-2 is configured to receive one or more of second, third live audio streams 124-2 and 124-3 via audio channels 114-1 and 114-2. Similar to processing device 102-1, processing device 102-2 may be enabled to generate a plurality of discrete audio data packets of the received second, third live audio streams 124-2 and 124-3 and transmit the generated discrete plurality of data packets over the first network 108 or another suitable network for receipt by processing device 102-1 and/or itself, in accordance with computer-executable instructions 106-2. Hence, according to some embodiments, the processing load associated with receiving the live audio streams, generating the discrete audio data packets and transmitting the discrete audio data packets over the system (e.g., system 100) can be distributed over multiple processing devices of the system.

According to some embodiments, one or more of the processing devices 102 are enabled to transmit the discrete audio data packets 126 for receipt by the remainder of the plurality of processing devices 102 or received by the at least one of the plurality of processing devices having the at least one audio channel associated therewith by unicast transmission or multicast transmission. According to some embodiments, one or more of the processing devices 102 are enabled to transmit the discrete audio data packets 126 for receipt by the remainder of the plurality of processing devices or received by the at least one of the plurality of processing devices having the at least one audio channel associated therewith in accordance with the User Datagram Protocol (UDP).

In accordance with the computer-executable instructions 106, a nominated processing device of the plurality of processing devices is enabled to receive a connection request from a respective mobile computing device of the plurality of mobile computing devices. For example, processing device 102-2 may be the nominated processing device and enabled to receive a connection request 130 from mobile computing device 132-1 (FIG. 2). The connection request 130 comprises a request for transmission of one of the live audio streams 124 (e.g., first live audio stream 124-1) to the respective mobile computing device (e.g., mobile computing device 132-1). According to some embodiments, the nominated processing device, 102-2, is in communication with a session manager 140, which accepts incoming streaming session requests from the mobile computing devices 132. According to some embodiments, the session manager 140 is a module or a subset of computer-executable instructions 106-2. According to some embodiments, each of the processing devices 102 is in communication with a respective session manager and each of the respective computer-executable instructions comprises a session manager. The session manager 140 accepts incoming requests for a live audio stream session, such as connection request 130, or to stop access to the live audio stream(s) for any one of the mobile computing devices 132. According to some embodiments, the session manager(s) are Real-Time Protocol (RTSP) session manager(s).

The nominated processing device, processing device 102-2 in the present example, is further enabled to determine a distribution status of each one of the processing devices 102 in respect of the transmission of either the plurality of discrete audio data packets 126, or transmission copies 126-1T to 126-pT (referred to collectively as transmission copies 126T) generated from the copies of the discrete audio data packets 126C (FIG. 8B), for receipt by the respective mobile computing device, such as mobile computing device 132-1. According to some embodiments, the distribution status indicates at least the ability of the applicable processing device to deliver the plurality of discrete audio data packets 126 or transmission copies 126T to the respective mobile computing device, such as mobile computing device 132-1.

Based on the determined distribution status, the nominated processing device 102-2 selects one of the processing devices 102 to transmit the discrete audio data packets 126 or transmission copies 126T for receipt by the respective mobile computing device, such as mobile computing device 132-1.

The selected processing device generates the transmission copies 126T from the copies 126C placed in the respective buffer accessible to the selected processing device. The selected processing device then transmits the discrete audio data packets 126 or transmission copies 126T for receipt by the respective mobile computing device, such as mobile computing device 132-1, over the first network 108 or the second network 134.

According to some embodiments, the distribution status of a respective processing device may comprise one or more of a load status, uptime, Quality of Service (QoS) and reliability metrics. Uptime, the time since the processing device was booted, may indicate that a processing device has failed if the reboot is unexpected, or it may indicate a new processing device has been added to the plurality of processing devices. By comparing QoS reports received from at least one of the mobile computing devices 132 in respect of a particular processing device with QoS reports in respect of the other processing devices, problems with that particular processing device may be identified (e.g., the processing device is transmitting the discrete audio data packets out of order or dropping discrete audio data packets). New connections to that processing device may then be stopped and the new connections may be assigned to other processing devices. Gathering statistics about each processing device's reliability over time may also be helpful. For example, statistics about lost packets, dropped connections and reboots can be used to develop metrics about the reliability of a particularly processing device. According to some embodiments, a reliability threshold is established and processing devices that fall below the reliability threshold are deemed "unreliable" and new connections from the mobile computing devices are avoided if or until the threshold is met or exceeded. According to some embodiments, an algorithm is used to assign new connections from the mobile computing devices to the most "reliable" processing devices, based on the reliability metrics. According to some embodiments, one or more factors are layered to determine the distribution status. For example, according to some embodiments, a subset of the processing devices 102 that meet a QoS threshold is identified, and then the processing load on each of the processing devices in that subset is determined to identify the ability of those processing devices to transmit the discrete audio data packets or the transmission copies to the requesting mobile computing device. It is understood that additional factors may be considered in the determination of the distribution status of a respective processing device of the plurality of processing devices 102.

When the distribution status of the nominated processing device indicates that the nominated processing device is available or able to transmit the discrete audio data packets 126 or transmission copies 126T, then the selected processing device is the nominated processing device (for example, as shown in FIGS. 2 and 8B). When the distribution status of the nominated processing device indicates that the nominated processing device is not available or suitable to transmit the discrete audio data packets 126, or transmission copies 126T, then the selected processing device is another one of the plurality of processing devices.

According to some embodiments, a processing device is nominated on the basis of load status, whereby the processing device with the lowest number of connected mobile computing devices is selected as the nominated processing device.

According to some embodiments, the described systems and methods provide some flexibility in how the requested transmissions are fulfilled. For example, the number of processing devices may change based on a number of factors, such as the current load on the processing devices, the number of live audio streams that are to be provided and the number of audio channels that are to be utilized for capturing the live audio streams. According to some embodiments, the number of processing devices constituting the plurality of processing devices (e.g., the plurality of processing devices 102) is based on one or more of: a number of audio channels allocated to receive the live audio streams in respect of the plurality of processing devices; and the determined distribution status of each one of the plurality of processing devices. According to some embodiments, a total number of audio channels will be provided to capture the live audio streams. The total number of audio channels may be pre-determined and/or may change over the delivery of the live audio streams during the live event. Since each processing device may be associated with a certain number of audio channels, which may vary depending on the particular processing device, a certain number of the processing devices will be required to provide the total number of audio channels. According to some embodiments, processing devices may be added as needed as the total number of audio channels provided increases or if any of the processing devices fails.

Figure 3:
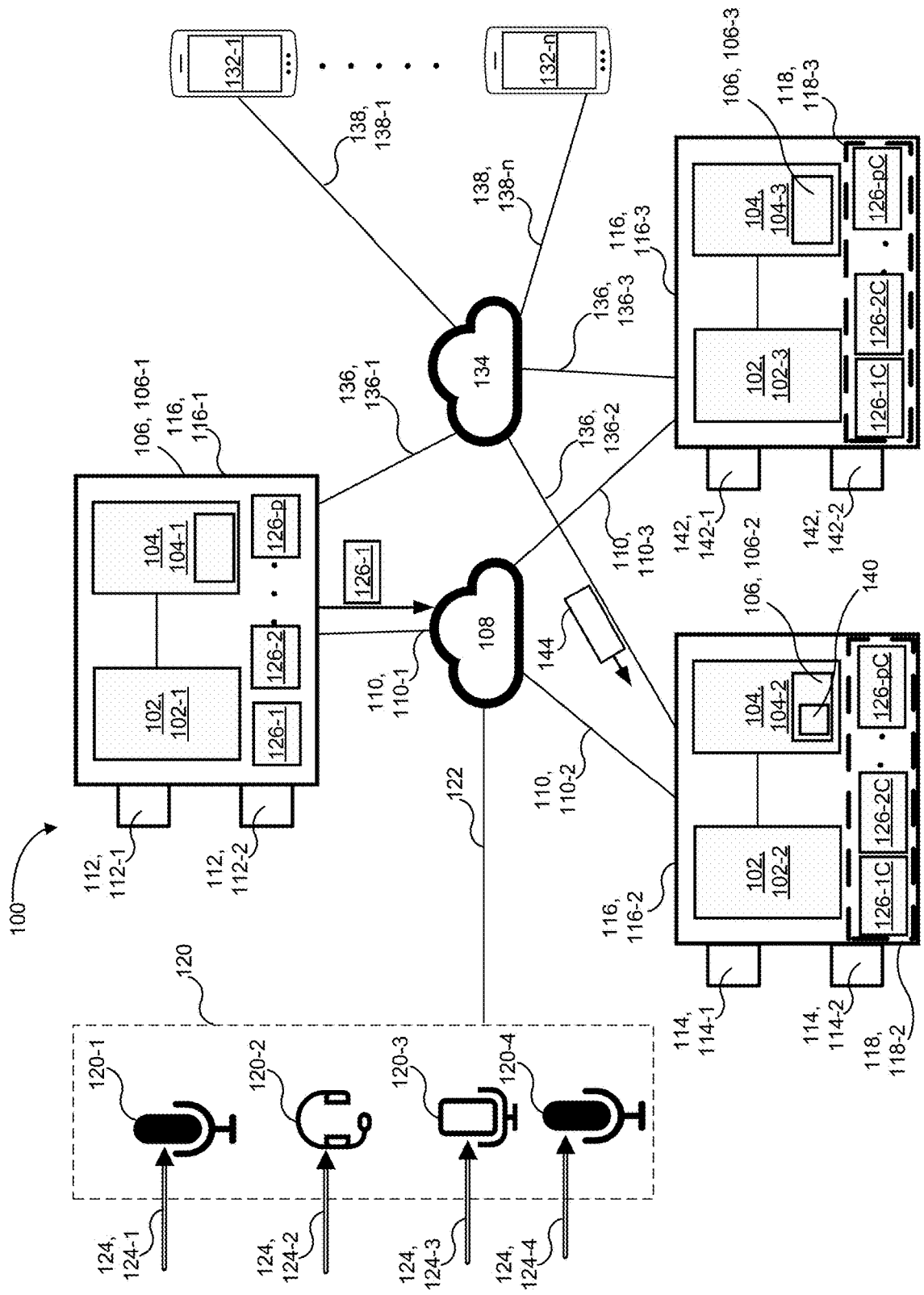
FIG. 3 depicts certain aspects of the example system for capturing and distributing live audio streams of FIGS. 1 and 2, according to non-limiting embodiments.

With that in mind, attention is directed to FIG. 3, which depicts example system 100 after one or more additional processing devices have been added and in which like or similar elements are denoted by like or similar numbers shown in FIGS. 1 and 2. According to some embodiments, the plurality of processing devices further comprises one or more additional processing devices, wherein the number of the one or more additional processing devices is based on one or more of: a number of audio channels allocated to receive the live audio streams; an expected number of the plurality of mobile computing devices; and the determined distribution status of each one of the plurality of processing devices prior to adding the one or more processing devices.

As discussed above, a certain number of audio channels may be allocated to provide the live audio streams. The number of allocated audio channels is based on a total number of live streams being captured and distributed. As live audio streams are added (i.e., as the total number of live audio streams increases), the number of audio channels allocated to provide the total live audio streams may also increase. For example, as shown in FIG. 3, a fourth live audio stream 124-4 has been added to the live audio streams 124. According to the example depicted in FIG. 3, by adding the fourth live audio stream 124-4 the number of audio channels required to distribute the live audio streams 124 has also increased. Additional processing device 102-3, associated with audio channels 142 (referred to individually as audio channel 142-1 and audio channel 142-2), is added to the plurality of processing devices 102. Additional processing device 102-3 is in network communication with processing devices 102-1 and 102-2 via the first network 108. For example, additional processing device 102-3 may be configured to communicate with processing devices 102-1 and 102-2 over the first network 108 via communication link 110-3. Additional processing device 102-3 is also configured to communicate with mobile computing devices 132 over, for example, the second network 134 via communication link 136-3. Communication links 110-3 and 136-3, may comprise any suitable wired and/or wireless communication link(s), or suitable combination thereof. According to some embodiments, additional processing device 102-3 is configured to communicate over the first network 108 over one or more suitable communication links. Additional processing device 102-3 may also be configured to transmit and receive data over the first network 108 or the second network 134 according to any suitable protocol or protocols, such as wireless data protocols, cellular device protocols, WiFi protocols, WiMax protocols, Real-Time Transport Protocol (RTP) and/or a combination of protocols.

Similarly to processing devices 102-1 and 102-2, additional processing device 102-3 is coupled to at least one memory 104, such as memory 104-3. Memory 104-3 is configured similarly to memory 104-1 and memory 104-2 and can comprise any suitable memory device. Like memory 104-1 and memory 104-2, memory 104-3 is configured to store computer executable instructions 106 (as computer executable instructions 106-3), for execution by at least one processing device, including processing device 102-3. Although processing device 102-3 and memory 104-3 are depicted as being co-located on computing device 116-3, it is understood that, according to some embodiments, processing device 102-3 and memory 104-3 are not located on the same computing devices. For example, according to some embodiments, computing device 116-3 comprises two or more servers in wired and/or wireless communication with each other, and processing device 102-3 is located at one of the servers while memory 104-3 is located at another one of the servers.

According to some embodiments, one or more processing devices, such as additional processing device 102-3, are added to the plurality of processing devices in response to an increase in the number of audio channels being allocated to capture and distribute the live audio streams. According to some embodiments, this addition of processing devices to the plurality of processing devices is performed automatically in real-time.

According to some embodiments, one or more processing devices, such as additional processing device 102-3, are added to the plurality of processing devices 102 based on an increase in the number of the plurality of mobile computing devices requesting transmission of one or more of the live audio streams. Based on an initial estimate or expected number of mobile computing devices that will request transmission of the live audio streams, an initial number of the plurality of processing devices to capture and distribute the live audio streams may be provided. As the number of mobile computing devices 132 increases, the number of processing devices 102 comprising the plurality of processing devices may be increased to, for example, better spread the computing load over the plurality of processing devices. According to some embodiments, the addition of processing devices is pre-emptive in that the present plurality of processing devices may be capable of fulfilling the increased requests for transmission of the live audio streams, but added as a precaution. For example, a pre-determined ratio of processing devices to mobile computing devices may be established and the addition of processing devices may be performed in order to maintain that pre-determined ratio.

According to some embodiments, the addition of processing devices to the plurality of processing devices 102 is based on the distribution status determined prior to adding one or more processing devices. For example, the distribution status may indicate that the load on each of the present plurality of processing devices is at or exceeding a maximum load (which may be pre-determined). Increasing the number of processing devices in the plurality of processing devices may help decrease the computing load on at least one of the present processing devices by directing new incoming traffic to an additional processing device. In addition, according to some embodiments, the addition of processing devices may allow for the re-allocation of the load among the plurality processing devices overall.

According to some embodiments, the described systems and methods may provide for a graceful recovery in the event one or more of the processing devices fails. For example, according to some embodiments, when any one of the processing devices 102 ceases to transmit the plurality of discrete audio data packets 126 (or the transmission copies 126T) to at least one of the mobile computing devices 132, the nominated processing device (e.g., processing device 102-2) or another nominated processing device of the plurality of processing devices 102 (which may include the additional processing device 102-3), takes certain actions to resume transmission of the plurality of discrete audio data packets 126 (or the transmission copies 126T).

The nominated processing device (e.g., processing device 102-2) receives a subsequent connection request 144 from the mobile computing device(s) no longer receiving the requested transmission, such as mobile computing device 132-1. The subsequent transmission request 144 comprises a subsequent request for transmission of one of the live audio streams to the mobile computing device(s). The nominated processing device determines a subsequent distribution status of each one of the plurality of processing devices 102 to transmit either the plurality of discrete audio data packets 126 (or the transmission copies 126T) for receipt by the at least one mobile computing device originating the subsequent connection request 144 (mobile computing device 132-1). Based on the subsequent distribution status, the nominated processing device selects a subsequent processing device, such as additional processing device 102-3, to transmit the plurality of discrete audio data packets 126 (or the copies 126T generated from copies 126C placed in respective accessible buffer 118-3) for receipt by the at least one mobile computing device, mobile computing device 132-1 in this example. The subsequent distribution status may indicate, for example, that additional processing device 102-3 has the lowest load of all of the processing devices 102 and is capable of transmitting the transmission copies 126T. For example, processing device 102-3 may be connected to the lowest number of mobile computing devices 132 and still online.

The selected processing device, such as processing device 102-3, transmits either the plurality of discrete audio data packets 126 (or the transmission copies 126T) for receipt by the at least one mobile computing device over the first network 108 or the second network 134. For example, the additional processing device 102-3 may transmit transmission copies 126T over the second network 134 for receipt by the mobile computing device 132-1.

Figure 4:
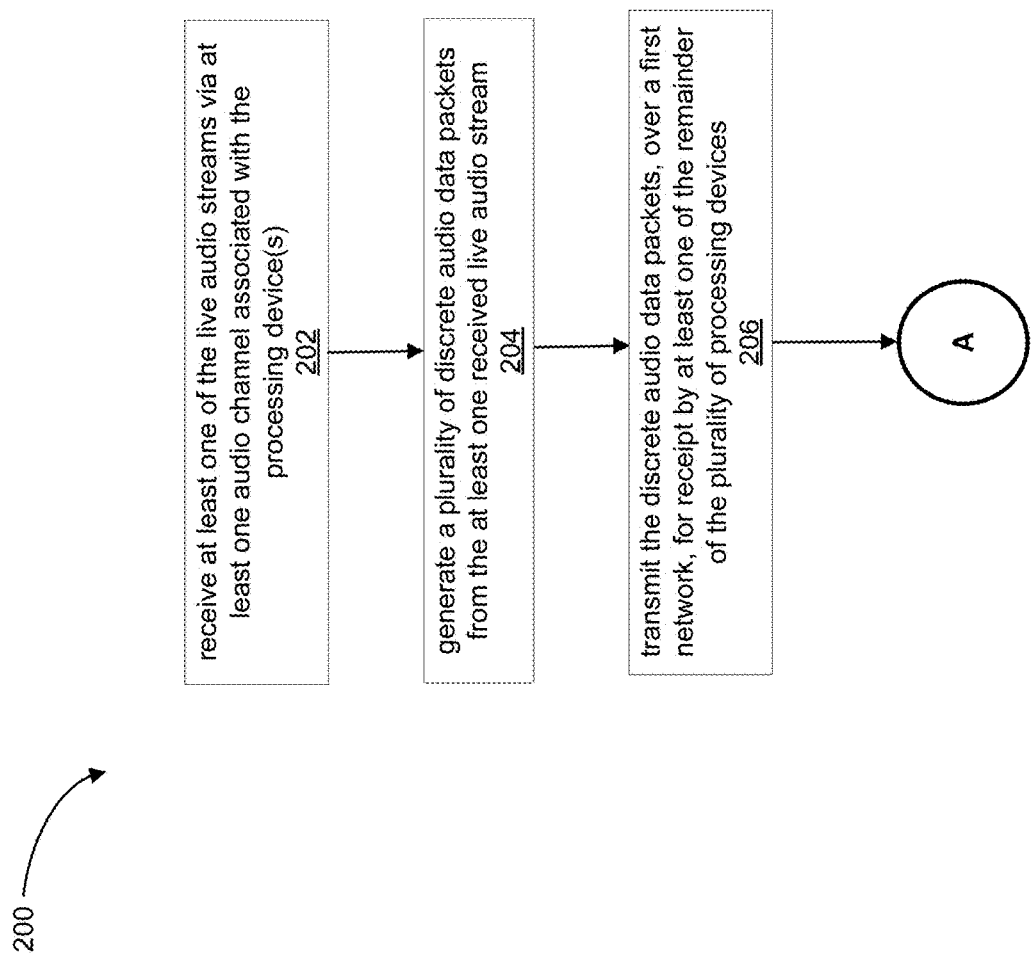
FIGS. 4 to 6 depict an example method for capturing and distributing live audio streams of a live event to a plurality of mobile computing devices, according to non-limiting embodiments.
Figure 5:
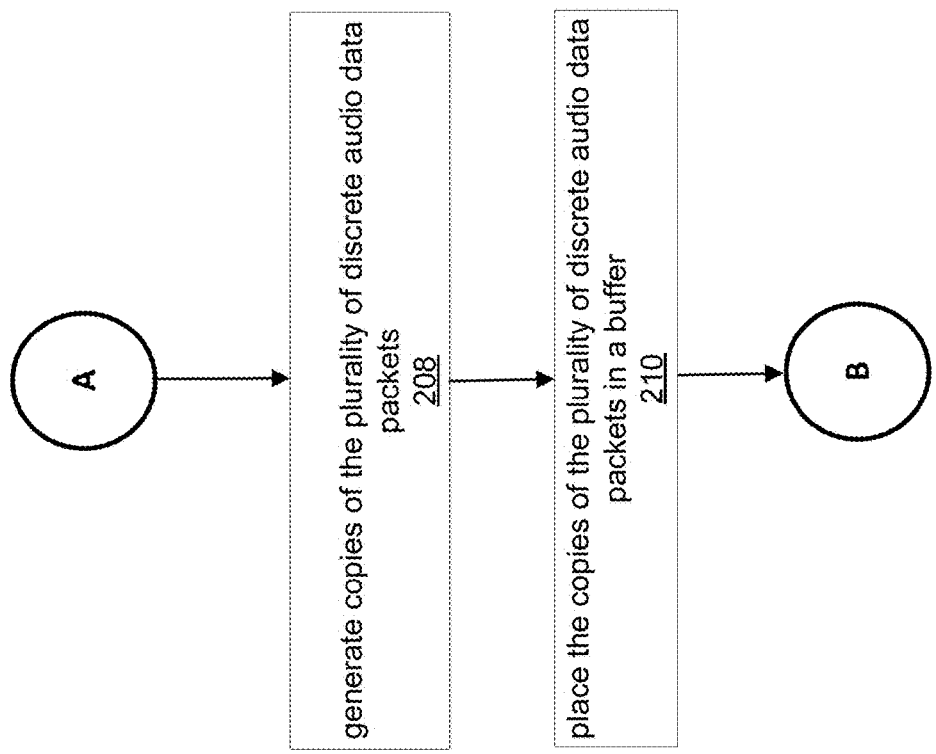
Figure 6:
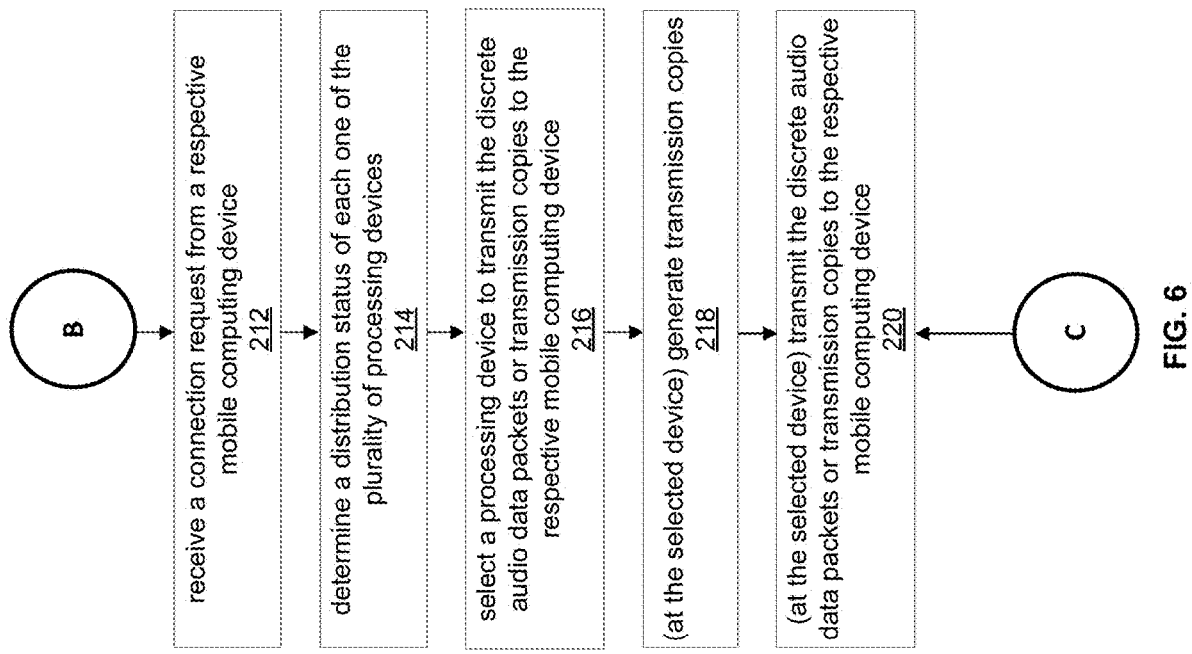

Attention is directed to FIGS. 4 to 6, which together depict a method for capturing and distributing live audio streams of a live event to a plurality of mobile computing devices. In order to assist in the explanation of method 200, it will be assumed that method 200 is performed using example system 100, as indicated. However, it is to be understood that example system 100 and/or method 200 can be varied, and need not work exactly as discussed herein in conjunction with each other, and that such variations are within the scope of present implementations.

It is appreciated that, in some aspects, method 200 is implemented by example system 100 by processing devices 102. Indeed, method 200 is one way in which example system 100 or example system 200 may be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

Blocks 202 to 206 (FIG. 4) are performed at at least one of the plurality of processing devices having the at least one audio channel associated therewith, such as processing device 102-1. At block 202, at least one of the live audio streams is received via the at least one audio channel associated with the processing device(s). For example, the first live audio stream 124-1 may be received by processing device 102-1 via audio channel 112-1. At block 204, a plurality of discrete audio data packets are generated from the at least one received live audio stream, such as plurality of discrete audio data packets 126. At block 206, the discrete audio data packets 126 are transmitted over a network, such as the first network 108, for receipt by at least one of the remainder of the plurality of processing devices, such as processing device 102-2. As discussed above, according to some embodiments, processing device 102-1 also transmits the plurality of discrete audio data packets 126 to itself such that processing device 102-1 and 102-2 receive the discrete audio data packets 126. According to some embodiments, processing device 102-1 receives the discrete audio data packets 126 from one of the other processing devices that generates the discrete the audio data packets 126.

Blocks 208 to 210 (FIG. 5) are performed at at least one of the processing devices, such as at at least one of processing devices 102. Each of the at least one processing devices generates copies of the discrete audio data packets 126 and places them in a buffer that is accessible to the respective processing device, such as buffer 118-2 for processing device 102-2 and buffer 118-3 for processing device 102-3. As discussed above, according to some embodiments, the processing device(s) participating in the audio capture activity generate copies of the discrete audio data packets prior to transmitting the discrete audio data packets to the remainder processing devices and may not receive the discrete audio data packets from any of the remainder processing devices or themselves.

Blocks 212 to 216 (FIG. 6) are performed at a nominated processing device of the plurality of processing devices. At block 212, a connection request is received from a respective mobile computing device of the plurality of mobile computing devices, such as connection request 130 from mobile computing device 132-1. As discussed above, the connection request comprises a request for transmission of one of the live audio streams to the respective mobile computing device. At block 214, the distribution status of each one of the plurality of processing devices is determined. As discussed above, the distribution status indicates at least the ability of the applicable processing device to deliver the plurality of discrete audio data packets (or the transmission copies) to the respective mobile computing device. At block 216, based on the distribution status, a processing device of the plurality of processing devices is selected to transmit either the plurality of discrete audio data packets or the transmission copies for receipt by the respective mobile computing device. For example, the determined distribution status of the processing device 102-2 may indicate that it is connected to the lowest number of mobile computing devices 132 and is capable of transmitting the requested transmission copies 126T to the mobile computing device 132-1.

Blocks 218 to 220 are performed at the selected processing device. At block 218, the transmission copies are generated from the copies of the discrete audio data packets in the buffer accessible to the selected processing device. For example, if processing device 102-2 is the selected processing device, then transmission copies 126T are generated at processing device 102-2 (see FIG. 8B). At block 220, the discrete audio data packets 126 or the transmission copies 126T are transmitted for receipt by the respective mobile computing device over the first network or a second network, such as second network 134.

According to some embodiments, one or more of blocks 202 to 220 are performed in real-time.

Attention is directed to FIG. 7, which depicts a method 300 for graceful recovery of transmission when any one of the plurality of processing devices ceases to transmit the plurality of discrete audio data packets or the transmission copies to at least one mobile computing device of the plurality of mobile computing devices. Similarly to method 200 depicted in FIGS. 4 to 6, in order to assist in the explanation of method 300, it will be assumed that method 300 is performed using example system 100, as indicated. However, it is to be understood that example system 100 and/or method 300 can be varied, and need not work exactly as discussed herein in conjunction with each other, and that such variations are within the scope of present implementations.

Blocks 302 to 306 are performed at a nominated processing device, which may be the processing device nominated in method 200 or another processing device of the plurality of processing devices. At block 302, the nominated processing device receives a subsequent connection request from at least one of the mobile computing devices (i.e., the mobile computing device(s) that is no longer receiving the requested transmission, such as mobile computing device 132-1). At block 304, a subsequent distribution status for each one of the processing devices is determined. The subsequent distribution status indicates at least the ability of the applicable processing device to deliver the plurality of discrete audio data packets, such as discrete audio data packets 126, or the transmission copies, such as copies 126T, to the at least one mobile computing device(s). At block 306, a subsequent processing device of the processing devices is selected to transmit either the plurality of discrete audio data packets or the transmission copies for receipt by the at least one mobile computing device(s).

At block 308, the selected subsequent processing device transmits one of the plurality of discrete audio data packets or the transmission copies for receipt by the at least one mobile computing device over the first network or a second network.

According to some embodiments, one or more of blocks 302 to 308 are performed in real-time.

Those skilled in the art will appreciate that in some implementations, the functionality of system 100 or methods 200, 300 can be implemented using pre-programmed hardware or firmware elements (e.g., application specific integrated circuits (ASICs), electrically erasable programmable read-only memories (EEPROMs), etc.), or other related components. In other implementations, the functionality of system 100 or methods 200, 300 can be achieved using a computing apparatus that has access to a code memory (not shown) which stores computer-readable program code for operation of the computing apparatus (such as computer executable instructions 106). The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variation within the scope of the issued claims and their equivalents.

EC. 1. A system for capturing and distributing live audio streams of a live event to a plurality of mobile computing devices, the system comprising: a plurality of processing devices in network communication with each other, at least one of the plurality of processing devices having at least one audio channel associated therewith; at least one memory coupled to the plurality of processing devices, the at least one memory configured to store computer-executable instructions, the computer-executable instructions when executed by the plurality of processing devices causing the plurality of processing devices to: at the at least one of the plurality of processing devices having the at least one audio channel associated therewith: receive at least one of the live audio streams via the at least one audio channel, generate a plurality of discrete audio data packets from the at least one received live audio stream, and transmit, over a first network, the plurality of discrete audio data packets for receipt by at least one of the remainder of the plurality of processing devices; at at least one of the plurality of processing devices: generate copies of the plurality of discrete audio data packets, and place the copies of the plurality of discrete audio data packets in a buffer accessible to the respective processing device of the plurality of processing devices; at a nominated processing device of the plurality of processing devices: receive a connection request from a respective mobile computing device of the plurality of mobile computing devices, the connection request including a request for transmission of one of the live audio streams to the respective mobile computing device, determine a distribution status of each one of the plurality of the processing devices to transmit either the plurality of discrete audio data packets or transmission copies generated from the copies for receipt by the respective mobile computing device originating the connection request, the distribution status indicating at least the ability of the applicable processing device to transmit the plurality of discrete audio data packets or the transmission copies to the respective mobile computing device, and based on the distribution status, select a processing device of the plurality of the processing devices to transmit the plurality of discrete audio data packets or the transmission copies for receipt by the respective mobile computing device; and at the selected processing device: generate the transmission copies of the plurality of discrete audio data packets from the copies placed in the buffer accessible by the selected processing device, and transmit the plurality of discrete audio data packets or the transmission copies for receipt by the respective mobile computing device over the first network or a second network.

EC. 2. The system of any one of the preceding or subsequent example combinations, such as EC. 1, wherein the computer-executable instructions are configured to further cause the at least one of the plurality of processing devices having the at least one audio channel associated therewith to receive, via the first network, the plurality of discrete audio packets from one or more of the at least one of the plurality of the processing devices having the at least one audio channel associated therewith and/or the remainder of the plurality of processing devices.

EC. 3. The system of any one of the preceding or subsequent example combinations, such as EC. 1, wherein the copies of the plurality of discrete audio data packets generated by the at least one of the plurality of the processing devices having the at least one audio channel associated therewith are generated prior to the transmission of the plurality of discrete audio data packets to the remainder of the plurality of processing devices.

EC. 4. The system of any one of the preceding or subsequent example combinations, such as any one of EC. 1 to EC. 3, wherein the number of processing devices constituting the plurality of processing devices is based on one or more of: a number of audio channels allocated to receive the live audio streams in respect of the plurality of processing devices; an expected number of the plurality of mobile computing devices; and the determined distribution status of each one of the plurality of processing devices.

EC. 5. The system of any one of the preceding or subsequent example combinations, such as any one of EC. 1 EC. 4, further comprising: one or more additional processing devices, wherein the plurality of processing devices comprises the one or more additional processing devices after they are added, the number of the one or more additional processing devices being based on one or more of: an increase in the number of the plurality of mobile computing devices requesting transmission of one of the live audio streams; an increase in the number of audio channels over the plurality of processing devices being allocated to capture and distribute the live audio streams; and the determined distribution status of each one of the plurality of processing devices prior to adding the one or more additional processing devices.

EC. 6. The system of any one of the preceding or subsequent example combinations, such as any one of EC. 1 to EC. 5, wherein the at least one live audio streams comprise at least a first live audio stream and a second live audio stream different than the first live audio stream.

EC. 7. The system of any one of the preceding or subsequent example combinations, such as any one of EC. 1 to EC. 6, wherein: when the distribution status of the nominated processing device indicates that the nominated processing device is able to transmit the plurality of discrete audio data packets or the transmission copies for receipt by the respective mobile computing device, the selected processing device is the nominated processing device, and when the distribution status of the nominated processing device indicates that the nominated processing device is not able to transmit the plurality of discrete audio data packets or the transmission copies for receipt by the respective mobile computing device, the selected processing device is another one of the plurality of processing devices.

EC. 8. The system of any one of the preceding or subsequent example combinations, such as any one of EC. 1 to EC. 7, wherein the computer-executable instructions are configured to further cause the plurality of processing devices to: when any one of the plurality of processing devices ceases to transmit the plurality of discrete audio data packets or the transmission copies to at least one mobile computing device of the plurality of mobile computing devices, at the nominated processing device or another nominated device of the plurality of processing devices: receive a subsequent connection request from the at least one mobile computing device, the subsequent connection request including a subsequent request for transmission of one of the live audio streams to the at least one mobile computing device, determine a subsequent distribution status of each one of the plurality of the processing devices to transmit either the plurality of discrete audio data packets or the transmission copies for receipt by the at least one mobile computing device originating the subsequent connection request, the subsequent distribution status indicating at least the ability of the applicable processing device to deliver the plurality of discrete audio data packets or the transmission copies to the at least one mobile computing device, based on the subsequent distribution status, select a subsequent processing device of the plurality of processing devices to transmit either the plurality of discrete audio data packets or the transmission copies for receipt by the at least one mobile computing device; at the selected subsequent processing device: transmit the plurality of discrete audio data packets or the transmission copies for receipt by the at least one mobile computing device over the first network or a second network.

EC. 9. The system of any one of the preceding or subsequent example combinations, such as any one of EC. 1 to EC. 8, wherein the plurality of discrete audio data packets are transmitted for receipt by the remainder of the plurality of processing devices or received by the at least one of the plurality of processing devices having the at least one audio channel associated therewith by multicast transmission or unicast transmission.

EC. 10. The system of any one of the preceding or subsequent example combinations, such as any one of EC. 1 to EC. 9, wherein the plurality of discrete audio data packets are transmitted for receipt by the remainder of the plurality of processing devices or received by the at least one of the plurality of processing devices having the at least one audio channel associated therewith in accordance with the User Datagram Protocol (UDP).

EC. 11. A non-transitory computer-readable medium for capturing and distributing live audio streams of a live event to a plurality of mobile computing devices, the computer-readable medium comprising computer-executable instructions for: at at least one of a plurality of processing devices in network communication with each other, the at least one of the plurality of processing devices having at least one audio channel associated therewith: at the at least one of the plurality of processing devices having the at least one audio channel associated therewith: receiving at least one of the live audio streams via the at least one audio channel, generating a plurality of discrete audio data packets from the at least one received live audio stream, and transmitting, over a first network, the plurality of discrete audio data packets for receipt by at least one of the remainder of the plurality of processing devices; at at least one of the plurality of processing devices: generating copies of the plurality of discrete audio data packets, and placing the copies of the plurality of discrete audio data packets in a buffer accessible to the respective processing device of the plurality of processing devices; at a nominated processing device of the plurality of processing devices: receiving a connection request from a respective mobile computing device of the plurality of mobile computing devices, the connection request including a request for transmission of one of the live audio streams to the respective mobile computing device, determining a distribution status of each one of the plurality of the processing devices to transmit either the plurality of discrete audio data packets or transmission copies generated from the copies for receipt by the respective mobile computing device originating the connection request, the distribution status indicating at least the ability of the applicable processing device to transmit the plurality of discrete audio data packets or the transmission copies to the respective mobile computing device, and based on the distribution status, selecting a processing device of the plurality of the processing devices to transmit the plurality of discrete audio data packets or the transmission copies for receipt by the respective mobile computing device; at the selected processing device: generating the transmission copies of the plurality of discrete audio data packets from the copies placed in the buffer accessible by the selected processing device, and transmitting the plurality of discrete audio data packets or the transmission copies for receipt by the respective mobile computing device over the first network or a second network.

EC. 12. The non-transitory computer-readable medium of any one of the preceding or subsequent example combinations, such as EC. 11, further comprising computer-executable instructions for: receiving, via the first network, the plurality of discrete audio packets at the at least one of the plurality of processing devices having the at least one audio channel associated therewith from one or more of the at least one of the plurality of the processing devices having the at least one audio channel associated therewith and/or the remainder of the plurality of processing devices.

EC. 13. The non-transitory computer-readable medium of any one of the preceding or subsequent example combinations, such as EC. 11, wherein the copies of the plurality of discrete audio data packets generated by the at least one of the plurality of the processing devices having the at least one audio channel associated therewith are generated prior to the transmission of the plurality of discrete audio data packets to the remainder of the plurality of processing devices.

EC. 14. The non-transitory computer-readable medium of any one of the preceding or subsequent example combinations, such as any one of EC. 11 to EC. 13, further comprising computer-executable instructions for: when any one of the plurality of processing devices ceases to transmit the plurality of discrete audio data packets or the transmission copies to at least one mobile computing device of the plurality of mobile computing devices, at the nominated processing device or another nominated device of the plurality of processing devices: receiving a subsequent connection request from the at least one mobile computing device, the subsequent connection request including a subsequent request for transmission of one of the live audio streams to the at least one mobile computing device, determining a subsequent distribution status of each one of the plurality of the processing devices to transmit either the plurality of discrete audio data packets or the transmission copies for receipt by the at least one mobile computing device originating the subsequent connection request, the subsequent distribution status indicating at least the ability of the applicable processing device to deliver the plurality of discrete audio data packets or the transmission copies to the at least one mobile computing device, based on the subsequent distribution status, selecting a subsequent processing device of the plurality of processing devices to transmit either the plurality of discrete audio data packets or the transmission copies for receipt by the at least one mobile computing device; and at the selected subsequent processing device: transmitting one of the plurality of discrete audio data packets or the transmission copies for receipt by the at least one mobile computing device over the first network or a second network.

EC. 15. A method for capturing and distributing live audio streams of a live event to a plurality of mobile computing devices, the method comprising: at at least one of a plurality of processing devices in network communication with each other, the at least one of the plurality of processing devices having at least one audio channel associated therewith: at the at least one of the plurality of processing devices having the at least one audio channel associated therewith: receiving at least one of the live audio streams via the at least one audio channel, generating a plurality of discrete audio data packets from the at least one received live audio stream, and transmitting, over a first network, the plurality of discrete audio data packets for receipt by at least one of the remainder of the plurality of processing devices; at at least one of the plurality of processing devices: generating copies of the plurality of discrete audio data packets, and placing the copies of the plurality of discrete audio data packets in a buffer accessible to the respective processing device of the plurality of processing devices; at a nominated processing device of the plurality of processing devices: receiving a connection request from a respective mobile computing device of the plurality of mobile computing devices, the connection request including a request for transmission of one of the live audio streams to the respective mobile computing device, determining a distribution status of each one of the plurality of the processing devices to transmit either the plurality of discrete audio data packets or transmission copies generated from the copies for receipt by the respective mobile computing device originating the connection request, the distribution status indicating at least the ability of the applicable processing device to transmit the plurality of discrete audio data packets or the transmission copies to the respective mobile computing device, and based on the distribution status, selecting a processing device of the plurality of the processing devices to transmit the plurality of discrete audio data packets or the transmission copies for receipt by the respective mobile computing device; and at the selected processing device: generating the transmission copies of the plurality of discrete audio data packets from the copies placed in the respective buffer, and transmitting the plurality of discrete audio data packets or the transmission copies for receipt by the respective mobile computing device over the first network or a second network.

EC. 16. The method of any one of the preceding or subsequent example combinations, such as EC. 15, further comprising receiving, via the first network, the plurality of discrete audio packets at the at least one of the plurality of processing devices having the at least one audio channel associated therewith from one or more of the at least one of the plurality of the processing devices having the at least one audio channel associated therewith and/or the remainder of the plurality of processing devices.

EC. 17. The method of any one of the preceding or subsequent example combinations, such as EC. 15, wherein the copies of the plurality of discrete audio data packets generated by the at least one of the plurality of the processing devices having the at least one audio channel associated therewith are generated prior to the transmission of the plurality of discrete audio data packets to the remainder of the plurality of processing devices.

EC. 18. The method of any one of the preceding or subsequent example combinations, such as any one of EC. 15 to EC. 17, wherein the number of processing devices constituting the plurality of processing devices is based on one or more of: a number of audio channels allocated to receive the live audio streams in respect of the plurality of processing devices; an expected number of the plurality of mobile computing devices; and the determined distribution status of each one of the plurality of processing devices.

EC. 19. The method of any one of the preceding or subsequent example combinations, such as any one of EC. 15 or EC. 18, further comprising: adding one or more additional processing devices to the plurality of processing devices based on one or more of: an increase in the number of the plurality of mobile computing devices requesting transmission of one of the live audio streams; an increase in the number of audio channels over the plurality of processing devices being allocated to capture and distribute the live audio streams; and the determined distribution status of each one of the plurality of processing devices prior to adding the one or more additional processing devices.

EC. 20. The method of any one of the preceding or subsequent example combinations, such as any one of EC. 15 to EC. 19, wherein the at least one live audio streams comprise at least a first live audio stream and a second live audio stream different than the first live audio stream.

EC. 21. The method of any one of the preceding or subsequent example combinations, such as any one of EC. 15 to EC. 20, wherein: when the distribution status of the nominated processing device indicates that the nominated processing device is able to transmit the plurality of discrete audio data packets or the transmission copies for receipt by the respective mobile computing device, the selected processing device is the nominated processing device, and when the distribution status of the nominated processing device indicates that the nominated processing device is not able to transmit the plurality of discrete audio data packets or the transmission copies for receipt by the respective mobile computing device, the selected processing device is another one of the plurality of processing devices.

EC. 22. The method of any one of the preceding or subsequent example combinations, such as any one of EC. 15 to EC. 21, further comprising: when any one of the plurality of processing devices ceases to transmit the plurality of discrete audio data packets or the transmission copies to at least one mobile computing device of the plurality of mobile computing devices, at the nominated processing device or another nominated device of the plurality of processing devices: receiving a subsequent connection request from the at least one mobile computing device, the subsequent connection request including a subsequent request for transmission of one of the live audio streams to the at least one mobile computing device, determining a subsequent distribution status of each one of the plurality of the processing devices to transmit either the plurality of discrete audio data packets or the transmission copies for receipt by the at least one mobile computing device originating the subsequent connection request, the subsequent distribution status indicating at least the ability of the applicable processing device to deliver the plurality of discrete audio data packets or the transmission copies to the at least one mobile computing device, based on the subsequent distribution status, selecting a subsequent processing device of the plurality of processing devices to transmit either the plurality of discrete audio data packets or the transmission copies for receipt by the at least one mobile computing device; and at the selected subsequent processing device: transmitting one of the plurality of discrete audio data packets or the transmission copies for receipt by the at least one mobile computing device over the first network or a second network.

EC. 23. The method of any one of the preceding or subsequent example combinations, such as any one of EC. 15 to EC. 22, wherein the plurality of discrete audio data packets or the copies therefrom are transmitted for receipt by the at least one of the remainder of the plurality of processing devices or received by the at least one of the plurality of processing devices having the at least one audio channel associated therewith by multicast transmission or unicast transmission.

EC. 24. The method of any one of the preceding or subsequent example combinations, such as any one of EC. 15 to EC. 23, wherein the plurality of discrete audio data packets are transmitted for receipt by the at least one of the remainder of the plurality of processing devices or received by the at least one of the plurality of processing devices having the at least one audio channel associated therewith in accordance with the User Datagram Protocol (UDP).

EC. 25. The method of any one of the preceding or subsequent example combinations, such as any one of EC. 15 to EC. 24, wherein the receiving, generating, transmitting and selecting are performed in real-time.

EC. 26. The method of any one of the preceding or subsequent example combinations, such as any one of EC. 15 to EC. 25, wherein the distribution status of a respective processing device of the plurality of processing devices comprises one or more of a load status, server uptime, quality of service and reliability metrics of the respective processing device.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for capturing and distributing live multimedia or video streams of a live event to a plurality of mobile computing devices, the system comprising:
   a plurality of processing devices in network communication with each other, at least one of the plurality of processing devices having at least one channel associated therewith; and
   at least one memory coupled to the plurality of processing devices, the at least one memory configured to store computer-executable instructions, the computer-executable instructions when executed by the plurality of processing devices causing the plurality of processing devices to:
      at the at least one of the plurality of processing devices having the at least one channel associated therewith:
         receive at least one of the live multimedia or video streams via the at least one channel,
         generate a plurality of discrete data packets from the at least one received live multimedia or video stream, and transmit, over a first network in accordance with at least Real-Time Transport Protocol (RTP), the plurality of discrete data packets for receipt by at least one of the remainder of the plurality of processing devices;

at at least one of the plurality of processing devices:
generate copies of the plurality of discrete data packets, and
place the copies of the plurality of discrete data packets in a buffer accessible to the at least one of the plurality of processing devices;

at a nominated processing device of the plurality of processing devices:
receive a connection request from a respective mobile computing device of the plurality of mobile computing devices, the connection request including a request for transmission of one of the live multimedia or video streams to the respective mobile computing device,
determine a distribution status of each one of the plurality of the processing devices to transmit transmission copies generated from the copies for receipt by the respective mobile computing device originating the connection request, the distribution status indicating at least the ability of the applicable processing device to transmit the transmission copies to the respective mobile computing device, and
based on the determined distribution status of each one of the plurality of the processing devices, select a processing device of the plurality of the processing devices to transmit the transmission copies for receipt by the respective mobile computing device; and at the selected processing device:
generate the transmission copies of the plurality of discrete data packets from the copies placed in the buffer accessible by the selected processing device, and
transmit the transmission copies for receipt by the respective mobile computing device over the first network or a second network;

wherein an end-to-end latency between the receipt of the at least one live multimedia or video streams via the at least one channel and the transmission of the transmission copies for receipt by the respective mobile computing device is 500 mS or less.

2. The system of claim 1, wherein the computer-executable instructions are configured to further cause the at least one of the plurality of processing devices having the at least one channel associated therewith to receive, via the first network, the plurality of discrete data packets from one or more of the at least one of the plurality of the processing devices having the at least one channel associated therewith and at least one of the remainder of the plurality of processing devices.

3. The system of claim 1, wherein the copies of the plurality of discrete data packets generated by the at least one of the plurality of the processing devices having the at least one channel associated therewith are generated prior to the transmission of the plurality of discrete data packets to the remainder of the plurality of processing devices.

4. The system of claim 1, wherein the number of processing devices constituting the plurality of processing devices varies based on one or more of:
a change in a number of channels allocated to receive the live multimedia or video streams in respect of the plurality of processing devices;
a change in the number of the plurality of mobile computing devices from a first number of mobile computing devices to a second number of mobile computing devices; and
a change in the determined distribution status of any one of the plurality of processing devices.

5. The system of claim 1, further comprising:
one or more additional processing devices, wherein the plurality of processing devices comprises the one or more additional processing devices, the number of the one or more additional processing devices being based on one or more of:
an increase in the number of the plurality of mobile computing devices requesting transmission of one of the live multimedia or video streams;
an increase in the number of channels over the plurality of processing devices being allocated to capture and distribute the live multimedia or video streams; and
the determined distribution status of each one of the plurality of processing devices prior to adding the one or more additional processing devices.

6. The system of claim 1, wherein the at least one live multimedia or video streams comprise at least a first live multimedia or video stream and a second live multimedia or video stream different than the first live multimedia or video stream.

7. The system of claim 1, wherein:
when the distribution status of the nominated processing device indicates that the nominated processing device is able to transmit the transmission copies for receipt by the respective mobile computing device, the selected processing device is the nominated processing device, and
when the distribution status of the nominated processing device indicates that the nominated processing device is not able to transmit the transmission copies for receipt by the respective mobile computing device, the selected processing device is another one of the plurality of processing devices.

8. The system of claim 1, wherein the computer-executable instructions are configured to further cause the plurality of processing devices to:
when any one of the plurality of processing devices ceases to transmit the transmission copies to at least one mobile computing device of the plurality of mobile computing devices,
at the nominated processing device or another nominated device of the plurality of processing devices:
receive a subsequent connection request from the at least one mobile computing device, the subsequent connection request including a subsequent request for transmission of one of the live multimedia or video streams to the at least one mobile computing device,
determine a subsequent distribution status of each one of the plurality of the processing devices to transmit the transmission copies for receipt by the at least one mobile computing device originating the subsequent connection request, the subsequent distribution status indicating at least the ability of the applicable processing device to deliver the transmission copies to the at least one mobile computing device, and
based on the subsequent distribution status of each one of the plurality of processing devices, select a subsequent processing device of the plurality of processing devices to transmit the transmission copies for receipt by the at least one mobile computing device; and at the selected subsequent processing device:
transmit the transmission copies for receipt by the at least one mobile computing device over the first network or the second network.

9. The system of claim 1, wherein the plurality of discrete data packets are transmitted for receipt by the remainder of the plurality of processing devices or received by the at least one of the plurality of processing devices having the at least one channel associated therewith in accordance with the User Datagram Protocol (UDP).

10. The system of claim 1, wherein the plurality of discrete multimedia or video packets are transmitted for receipt by the remainder of the plurality of processing devices or received by the at least one of the plurality of processing devices having the at least one channel associated therewith by multicast transmission or unicast transmission.

11. The system of claim 1, wherein one or more of the first network and the second network is a cellular network or a Local Area Network (LAN).

12. A non-transitory computer-readable medium for capturing and distributing live multimedia or video streams of a live event to a plurality of mobile computing devices, the computer-readable medium comprising computer-executable instructions for:
at at least one of a plurality of processing devices in network communication with each other, the at least one of the plurality of processing devices having at least one channel associated therewith:
at the at least one of the plurality of processing devices having the at least one channel associated therewith:
receiving at least one of the live multimedia or video streams via the at least one channel,
generating a plurality of discrete data packets from the at least one received live multimedia or video stream, and
transmitting, over a first network in accordance with at least Real-Time Transport Protocol (RTP), the plurality of discrete data packets for receipt by at least one of the remainder of the plurality of processing devices;
at at least one of the plurality of processing devices:
generating copies of the plurality of discrete data packets, and
placing the copies of the plurality of discrete data packets in a buffer accessible to the at least one of the plurality of processing devices;
at a nominated processing device of the plurality of processing devices:
receiving a connection request from a respective mobile computing device of the plurality of mobile computing devices, the connection request including a request for transmission of one of the live multimedia or video streams to the respective mobile computing device,
determining a distribution status of each one of the plurality of the processing devices to transmit transmission copies generated from the copies for receipt by the respective mobile computing device originating the connection request, the distribution status indicating at least the ability of the applicable processing device to transmit the transmission copies to the respective mobile computing device, and
based on the determined distribution status of each one of the plurality of the processing devices, selecting a processing device of the plurality of the processing devices to transmit the transmission copies for receipt by the respective mobile computing device; and at the selected processing device:
generating the transmission copies of the plurality of discrete data packets from the copies placed in the buffer accessible by the selected processing device, and
transmitting the plurality of discrete data packets or the transmission copies for receipt by the respective mobile computing device over the first network or a second network;
wherein an end-to-end latency between the receipt of the at least one live multimedia or video streams via the at least one channel and the transmission of the transmission copies for receipt by the respective mobile computing device is 500 mS or less.

13. The non-transitory computer-readable medium of claim 12, further comprising computer-executable instructions for:
when any one of the plurality of processing devices ceases to transmit the transmission copies to at least one mobile computing device of the plurality of mobile computing devices, at the nominated processing device or another nominated device of the plurality of processing devices:
receiving a subsequent connection request from the at least one mobile computing device, the subsequent connection request including a subsequent request for transmission of one of the live multimedia or video streams to the at least one mobile computing device,
determining a subsequent distribution status of each one of the plurality of the processing devices to transmit the transmission copies for receipt by the at least one mobile computing device originating the subsequent connection request, the subsequent distribution status indicating at least the ability of the applicable processing device to deliver the transmission copies to the at least one mobile computing device, and
based on the subsequent distribution status of each one of the plurality of processing devices, selecting a subsequent processing device of the plurality of processing devices to transmit the transmission copies for receipt by the at least one mobile computing device; and
at the selected subsequent processing device:
transmitting the transmission copies for receipt by the at least one mobile computing device over the first network or the second network.

14. The non-transitory computer-readable medium of claim 12, wherein the plurality of discrete data packets are transmitted for receipt by the remainder of the plurality of processing devices or received by the at least one of the plurality of processing devices having the at least one channel associated therewith by multicast transmission or unicast transmission.

15. The non-transitory computer-readable medium of claim 12, wherein the plurality of discrete data packets are transmitted for receipt by the remainder of the plurality of processing devices or received by the at least one of the plurality of processing devices having the at least one channel associated therewith in accordance with the User Datagram Protocol (UDP).

16. A method for capturing and distributing live multimedia or video streams of a live event to a plurality of mobile computing devices, the method comprising:
at at least one of a plurality of processing devices in network communication with each other, the at least one of the plurality of processing devices having at least one channel associated therewith:
at the at least one of the plurality of processing devices having the at least one channel associated therewith:
receiving at least one of the live multimedia or video streams via the at least one channel,
generating a plurality of discrete data packets from the at least one received live multimedia or video stream, and
transmitting, over a first network in accordance with at least Real-Time Transport Protocol (RTP), the plurality of discrete data packets for receipt by at least one of the remainder of the plurality of processing devices;
at at least one of the plurality of processing devices:
generating copies of the plurality of discrete data packets, and
placing the copies of the plurality of discrete data packets in a buffer accessible to the at least one of the plurality of processing devices;
at a nominated processing device of the plurality of processing devices:
receiving a connection request from a respective mobile computing device of the plurality of mobile computing devices, the connection request including a request for transmission of one of the live multimedia or video streams to the respective mobile computing device,
determining a distribution status of each one of the plurality of the processing devices to transmit transmission copies generated from the copies for receipt by the respective mobile computing device originating the connection request, the distribution status indicating at least the ability of the applicable processing device to transmit the transmission copies to the respective mobile computing device, and
based on the determined distribution status of each one of the plurality of the processing devices, selecting a processing device of the plurality of the processing devices to transmit the transmission copies for receipt by the respective mobile computing device; and
at the selected processing device:
generating the transmission copies of the plurality of discrete data packets from the copies placed in the respective buffer, and
transmitting the transmission copies for receipt by the respective mobile computing device over the first network or a second network;
wherein an end-to-end latency between the receipt of the at least one live multimedia or video streams via the at least one channel and the transmission of the transmission copies for receipt by the respective mobile computing device is 500 mS or less.

17. The method of claim 16, wherein the plurality of discrete data packets are transmitted for receipt by the remainder of the plurality of processing devices or received by the at least one of the plurality of processing devices having the at least one channel associated therewith by multicast transmission or unicast transmission.

18. The method of claim 16, wherein the plurality of discrete data packets are transmitted for receipt by the remainder of the plurality of processing devices or received by the at least one of the plurality of processing devices having the at least one channel associated therewith in accordance with the User Datagram Protocol (UDP).

19. The method of claim 16, wherein the number of processing devices constituting the plurality of processing devices varies based on one or more of:
a change in a number of channels allocated to receive the live multimedia or video streams in respect of the plurality of processing devices;
a change in the number of the plurality of mobile computing devices from a first number of mobile computing devices to a second number of mobile computing devices; and
a change in the determined distribution status of any one of the plurality of processing devices.

20. The method of claim 16, further comprising:
adding one or more additional processing devices to the plurality of processing devices based on one or more of:
an increase in the number of the plurality of mobile computing devices requesting transmission of one of the live multimedia or video streams;
an increase in the number of channels over the plurality of processing devices being allocated to capture and distribute the live multimedia or video streams; and
the determined distribution status of each one of the plurality of processing devices prior to adding the one or more additional processing devices.

21. The method of claim 16, wherein the at least one live multimedia or video streams comprise at least a first live multimedia or video stream and a second live multimedia or video stream different than the first live multimedia or video stream.

22. The method of claim 16, wherein:
when the distribution status of the nominated processing device indicates that the nominated processing device is able to transmit the transmission copies for receipt by the respective mobile computing device, the selected processing device is the nominated processing device, and
when the distribution status of the nominated processing device indicates that the nominated processing device is not able to transmit the transmission copies for receipt by the respective mobile computing device, the selected processing device is another one of the plurality of processing devices.

23. The method of claim 16, further comprising:
when any one of the plurality of processing devices ceases to transmit the transmission copies to at least one mobile computing device of the plurality of mobile computing devices,
at the nominated processing device or another nominated device of the plurality of processing devices:
receiving a subsequent connection request from the at least one mobile computing device, the subsequent connection request including a subsequent request for transmission of one of the live multimedia or video streams to the at least one mobile computing device,
determining a subsequent distribution status of each one of the plurality of the processing devices to transmit the transmission copies for receipt by the at least one mobile computing device originating the subsequent connection request, the subsequent distribution status indicating at least the ability of the applicable processing device to deliver the transmission copies to the at least one mobile computing device, and based on the subsequent distribution status of each one of the plurality of processing devices, selecting a subsequent processing device of the plurality of processing devices to transmit either the transmission copies for receipt by the at least one mobile computing device; and at the selected subsequent processing device:
transmitting the transmission copies for receipt by the at least one mobile computing device over the first network or the second network.

24. The method of claim 16, wherein one or more of the first network and the second network is a cellular network or a Local Area Network (LAN).

* * * * *